Figure 1:
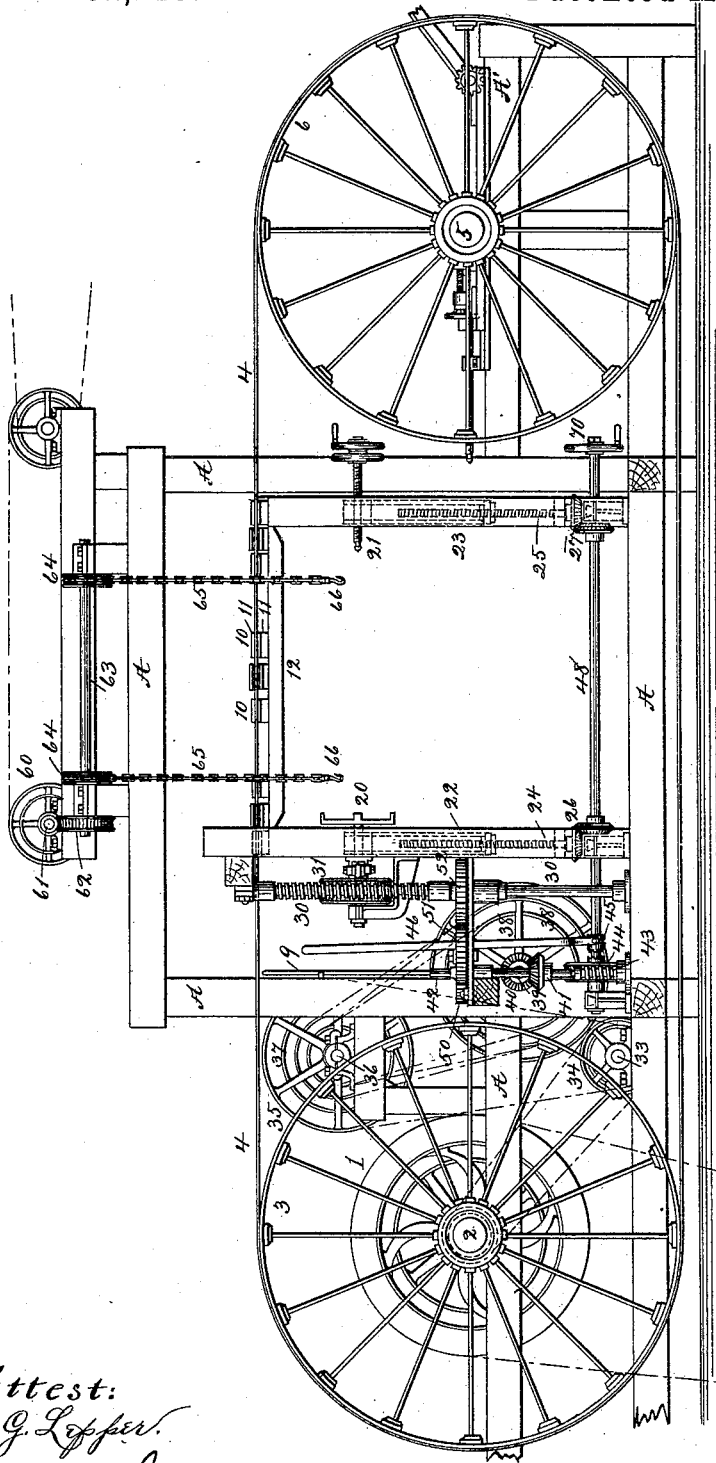

(No Model.) 2 Sheets—Sheet 1.

C. W. & A. S. GAGE.
BAND SAW VENEER CUTTER.

No. 452,219. Patented May 12, 1891.

FIG. 1ª.

Attest:
J. G. Lepper
O. W. Johnson

Inventors
C. W. Gage
A. S. Gage
By W. H. Bartlett Att'y.

(No Model.) 2 Sheets—Sheet 2.
C. W. & A. S. GAGE.
BAND SAW VENEER CUTTER.
No. 452,219. Patented May 12, 1891.
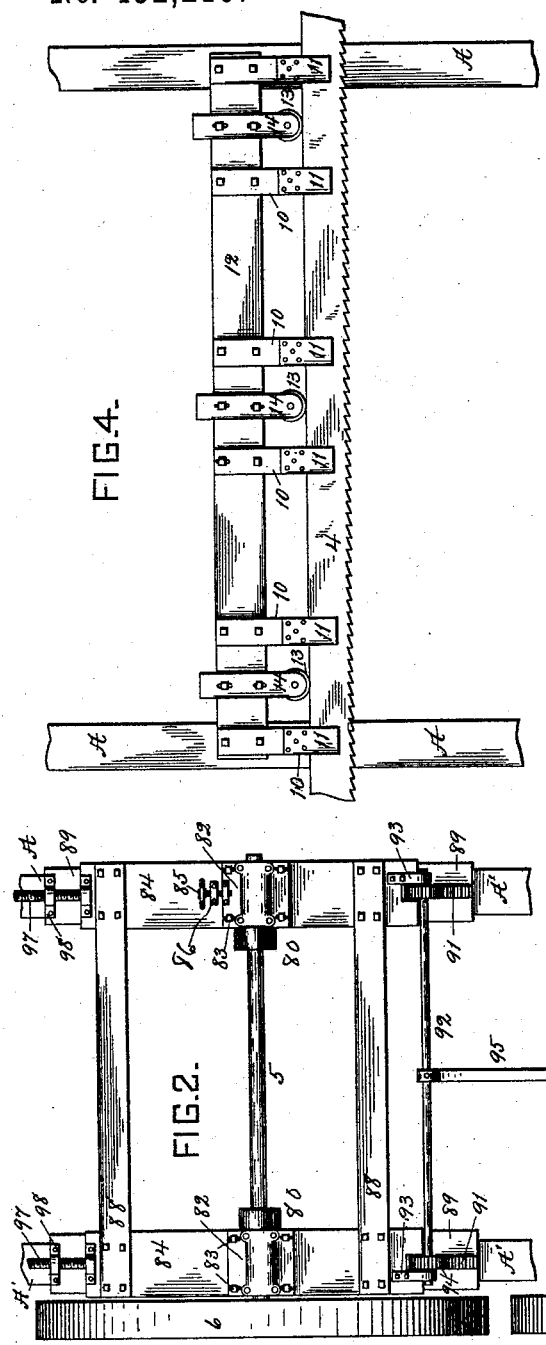
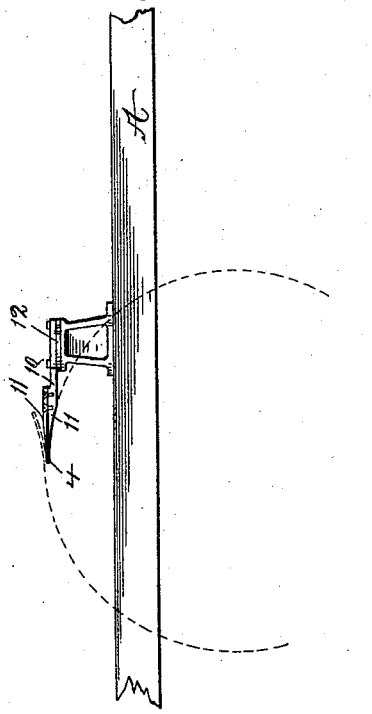
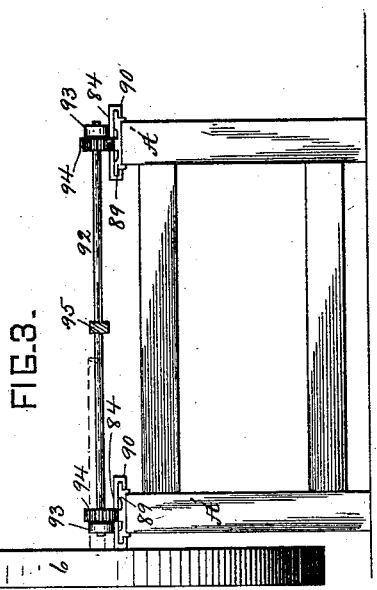

UNITED STATES PATENT OFFICE.

CHARLES W. GAGE AND ADELBERT S. GAGE, OF HOMER, NEW YORK; EDWARD C. JOHNSON ADMINISTRATOR OF SAID CHARLES W. GAGE, DECEASED.

BAND-SAW VENEER-CUTTER.

SPECIFICATION forming part of Letters Patent No. 452,219, dated May 12, 1891.

Application filed June 4, 1890. Serial No. 354,194. (No model.)

*To all whom it may concern:*

Be it known that we, CHARLES W. GAGE and ADELBERT S. GAGE, residing at Homer, in the county of Cortland and State of New York, have invented certain new and useful Improvements in Band-Saw Veneer-Cutters, of which the following is a specification, reference being had therein to the accompanying drawings.

This invention relates to band sawing-machines, especially for use in sawing veneers or lumber in continuous spiral strips from a log.

The object of the invention is to improve the construction of sawing-machines of the character described, and especially that part which has supports and guides the saw to its work.

Figure 1 is a front elevation of the machine, some parts being omitted for clearness of illustration. Fig. 1ª is a diagram of driving-gear. Fig. 2 is a plan of the adjustable band-pulley and supports, and Fig. 3 an end view of same. Fig. 4 is a plan view of part of the saw-blade and the guides. Fig. 5 is an outline of log and section of saw and guide.

The numeral 1 indicates the driving-pulley, which is secured to shaft 2. The shaft 2 carries the driving-band pulley 3, over which the saw 4 runs. The saw 4 runs continuously in one direction, as usual in band-saws. The saw is strained by movement of the shaft 5 of band-wheel 6. The saw is guided in the kerf of the log and held up to its work by guides 10 10, &c., which guides have top and bottom fingers 11 11, which extend into the kerf cut by the saw, and support the blade nearly to its front edge to prevent cramping or bending. The guides 10 are firmly secured to a brace 12, which extends across the frame parallel with the saw-blade. The guides 10 are preferably arranged in pairs on this fixed brace 12, and each guide 10 has a pair of fingers, which fingers embrace the saw-blade and enter the saw-kerf. Between each pair of guides 10 an arm 14 on the brace supports a pulley 13. The back of the saw runs in a groove in the face of these pulleys 13. The saw is thus held by fingers 11 against chatter or strain in vertical direction, and the pulleys 13 take up the pressure which would tend to press the saw off from the band-wheels 3 and 6. The pulleys need not enter the saw-kerf, but the fingers 11 enter the kerf alongside the saw-blade, the kerf being slightly opened for the purpose by the front of the fingers. The veneer cut from the log rides over the saw-guides and pulleys.

The log is held between the centering-chucks 20 and 21. These chucks are supported in suitable bearing-pieces 22 and 23, (indicated in dotted lines, Fig. 1,) and the chucks and their bearings are raised by the screws 24 and 25. Screws 24 and 25 are driven by the bevel-gearing 26 and 27, the general arrangement of such chucks and driving-gear being common. The chuck 20 is made to rotate (and so turns the log) by means of worm-gear 30, engaging worm-wheel 31 on the spindle of the chuck.

The screws for raising the log-holding chucks and the worm-gear for driving the live-chuck are driven from the main shaft 2 by a train of pulleys and belts or by equivalent gearing. We show a convenient form of driving connections in Fig. 1. The counter-shaft 33 is driven by a belt from shaft 2. A pulley 34 on this counter-shaft is belted to pulley 35 on shaft 36. A number of fast pulleys 37 37 on shaft 36 are connected to loose pulleys 38 38 on shaft 39. The loose pulleys may be shifted into clutch engagement with shaft 39 by means of levers, as 9, operating to make clutch engagement, in usual way. A bevel-gear 40 on shaft 39 engages a similar gear on upright shaft 42. Shaft 42 has a worm 43 near one end, which engages the worm-gear 44, which runs loosely on shaft 48, which drives the bevel-pinions 26 and 27. A shifting clutch 45, operated by hand-lever 46, serves to engage the shaft 48 with the worm-wheel 44, so that the shaft will rotate with said worm-wheel when the clutch is engaged, the clutch engagement being a common one. A pinion 50 on shaft 42 engages an intermediate pinion 51, which in turn engages the driving-pinion 52 on the worm-gear shaft 30. Thus the upright shaft 42 serves to drive both the chuck-rotating and the chuck-raising devices, and the speed of shaft 42 may be regulated by connecting appropriate driving-pulleys 37 and 38.

The rotating speed of the chuck 20 may be varied by changing the gear 50 and substituting a different size. The gear 51 is supported on a movable axle to engage the gears 50 and 52, whatever the size of the gear 50 in use may be. (See diagram Fig. 1ᵃ. Thus the speed of rotation of the chuck and log need not always bear the same relation to the speed of the lift of the log, and by this means any desirable thickness may be given to the lumber or veneer.

Pulley 60, above the frame proper, is driven by any suitable belt connection. This pulley drives shaft 61, which in turn drives the pulley 62, preferably by a worm connection.

Pulley or gear 62 is fixed to shaft 63, which bears two sprocket-wheels 64. These sprocket-wheels 64 engage with the links of chains 65, which chains have swiveled hooks 66 to catch into any suitable supporting-clamps on the log, and so serve as an elevator to lift the log into position between the centers of the chucks.

The centering-chucks may be raised or lowered by the hand-wheel 70 when clutch 45 is disengaged.

The frame A is merely a suitable support for the shafts and connections. It will be understood that any usual construction may be used.

The shaft 5 of adjustable band-wheel 6 is supported in bearings on the frame A′. The shaft may be moved toward or from shaft 2. The band-wheel 6 is keyed to shaft 5. Collars 80, near the bearing-boxes 82 of said shaft, may be moved lengthwise of the shaft and fastened in any suitable manner, thus giving endwise adjustment to the shaft 5 and pulley 6.

The bearing-boxes 82, in which shaft 5 runs, are supported on plates 84 and held thereto by bolts 83, which pass through slots in the box-flanges, permitting the boxes to have a slight adjustment relatively to plates 84, which plates rest on caps on frame A′. One of the bearing-boxes may have a set-screw connection 85, by which it is adjusted. Both boxes are held to plates 4, when adjusted, by tightening bolts 83. The set-screw 85 has a swivel connection with its bearing-box and passes through a nut 86, attached to plate 4. When bolts 83 are loosened, the box 82 may be moved forward or back by turning hand-wheel 87, thus moving one end of shaft 5, and giving pulley 6 a lead in one direction or the other, tending to throw the back of the band-saw with more or less force against the rolls 13. The plates 84 are tied together by cross-bars 88, thus forming a frame or sash which rests on caps 89, fixed on the frame A, the plates 84 having overhanging gibs 90, which embrace said caps. The caps 89 are provided with racks 91, which lie under the plates 84. A shaft 92 has its bearings in brackets 93, firmly secured to the plates 84. Pinions 94, firmly secured to shaft 92, engage the racks 91. A lever 95, held to shaft 92 by set-screw or otherwise, has a weight 96 at its outer end. The weighted lever thus tends to rotate shaft 92, which puts a constant strain on the saw by means of the rack and pinion drawing on the frame or sash 84 88, which supports the saw-pulley shaft.

Screw-followers 97, passing through nuts 98 on frame A′, prevent sudden backward movement of the pulley-supporting sash in case of breakage.

It will be understood that we do not limit our construction to the precise mechanism, shown, as equivalent mechanism may be employed. The tension apparatus by which the frame or sash 84 88 is drawn might be a weight or spring acting directly, instead of through a rack-and-pinion gear.

What we claim is—

1. In a band-saw machine, the combination, with the saw-blade, of saw-guides having fingers which project into the saw-kerf alongside the blade of the saw, and anti-friction rolls serving as bearings for the back of the blade and behind the saw in the kerf, substantially as described.

2. In a band-saw machine, the combination of the saw-blade, the band-pulleys, one of which is adjustable, and a saw-guide fixed to the machine, which has fingers embracing the sides of the blade and interposed between the band-pulleys, so as to enter the saw-kerf with the blade, substantially as described.

3. In a band-saw machine, the combination of the saw, the band-pulleys, the fixed saw-guides embracing the faces of the saw and entering the kerf between the band-pulleys, and an anti-friction roll bearing against the back of the saw between the guides behind said kerf, substantially as described.

4. In a band-saw machine, the combination of the saw, a bar parallel therewith and fixed to the frame, a series of saw-guides secured to this bar and bearing on the flat faces of the saw toward the front or toothed edge of the saw within the kerf, and a roller supported by said bar and bearing against the back of the saw behind the kerf.

5. In a sawing-machine of the character described, the combination of a driving-shaft having a series of pulleys of different sizes, a counter-shaft, as 39, having corresponding pulleys, any one of which may be thrown into driving engagement, and a shaft geared to said shaft 39, having a worm-gear which drives the chuck-lifting apparatus, and a pinion and worm-gear for driving the live-chuck, substantially as described.

6. In a sawing-machine of the character described, the combination of the shaft 39, suitably driven, the interchangeable and exchangeable pinions engaging therewith, the worm-gear driven by said pinions, and the live-chuck driven by said worm-gear.

7. The combination, with the worm-wheel 44 and its driving-worm, of the shaft 48 and clutch for connecting said shaft to the worm, the centering-chucks and their supporting-screws, and the bevel-gears on shaft 48, operatively engaging said screws to raise the lathe-centers, substantially as described.

8. The combination, with the main frame, of the movable sash having bearings for the adjustable band-wheel shaft, collars on the shaft, by means of which the shaft may be adjusted lengthwise in said bearings, and tension apparatus by which the saw is strained, substantially as described.

9. The combination of the main frame, the movable sash thereon carrying the band-wheel shaft, tension apparatus by which the same is moved and the saw strained, and screw-followers to prevent backward movement of the sash, substantially as described.

In testimony whereof we affix our signatures in presence of two witnesses.

CHARLES W. GAGE.
ADELBERT S. GAGE.

Witnesses:
JOHN J. ARNOLD,
DELLA P. GAGE.